US010386862B2

(12) United States Patent
Junk et al.

(10) Patent No.: US 10,386,862 B2
(45) Date of Patent: Aug. 20, 2019

(54) CUT-OFF TRANSITION FOR CONTROL VALVE POSITIONERS

(71) Applicant: FISHER CONTROLS INTERNATIONAL LLC, Marshalltown, IA (US)

(72) Inventors: Kenneth W. Junk, Marshalltown, IA (US); Michel K. Lovell, Marshalltown, IA (US); Jimmie L. Snowbarger, Marshalltown, IA (US); Jeffrey D. Seyller, Colo, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 319 days.

(21) Appl. No.: 14/876,059

(22) Filed: Oct. 6, 2015

(65) Prior Publication Data
US 2016/0098044 A1 Apr. 7, 2016

Related U.S. Application Data
(60) Provisional application No. 62/060,549, filed on Oct. 6, 2014.

(51) Int. Cl.
G05D 7/06 (2006.01)
F16K 37/00 (2006.01)

(52) U.S. Cl.
CPC ....... G05D 7/0635 (2013.01); F16K 37/0083 (2013.01)

(58) Field of Classification Search
None
See application file for complete search history.

(56) References Cited

U.S. PATENT DOCUMENTS

| 5,819,848 A * | 10/1998 | Rasmuson | E21B 47/0007 166/250.15 |
| 7,891,375 B2 | 2/2011 | Decker | |
| 8,421,643 B2 | 4/2013 | Grumstrup | |
| 9,684,292 B1 * | 6/2017 | Wiens | G05B 21/02 |
| 2002/0145515 A1 * | 10/2002 | Snowbarger | G05B 9/02 340/514 |
| 2003/0019224 A1 * | 1/2003 | Vander Woude | F17C 7/04 62/186 |

(Continued)

FOREIGN PATENT DOCUMENTS

CN 101265990 A 9/2008

OTHER PUBLICATIONS

International Search Report and Written Opinion for corresponding International application No. PCT/US2015/054113, dated May 13, 2016.

(Continued)

Primary Examiner — Tuan C Dao
(74) Attorney, Agent, or Firm — Marshall Gerstein & Borun LLP

(57) ABSTRACT

The present invention includes a method, apparatus, and computer readable medium for controlling a valve. Example embodiments of the present invention described herein utilize a soft cutoff threshold and soft cutoff procedure at which point the controller monotonically ramps a servo set-point to slowly overdrive the servo beyond a calibrated set-point range, wherein the servo transitions into a hard cutoff when the servo set-point reaches a predefined overdrive threshold.

24 Claims, 4 Drawing Sheets

(56) References Cited

U.S. PATENT DOCUMENTS

| | | | |
|---|---|---|---|
| 2006/0118169 A1* | 6/2006 | Junk | G05B 13/024 |
| | | | 137/82 |
| 2006/0243331 A1* | 11/2006 | Fuller | F04B 27/1804 |
| | | | 137/596.16 |
| 2008/0004836 A1 | 1/2008 | Tewes et al. | |
| 2009/0146953 A1* | 6/2009 | Lou | G06F 3/0346 |
| | | | 345/163 |
| 2010/0040468 A1* | 2/2010 | Andersen | F03D 7/0224 |
| | | | 416/1 |
| 2010/0256784 A1* | 10/2010 | Seberger | G05B 19/44 |
| | | | 700/33 |
| 2012/0059506 A1* | 3/2012 | Okita | G05B 13/0265 |
| | | | 700/173 |
| 2012/0139725 A1* | 6/2012 | Grumstrup | F16K 37/0091 |
| | | | 340/540 |
| 2012/0216898 A1* | 8/2012 | Carter | F15B 11/068 |
| | | | 137/861 |
| 2013/0008226 A1* | 1/2013 | Quer | G01L 9/0008 |
| | | | 73/1.82 |
| 2014/0069508 A1 | 3/2014 | Minervini | |
| 2015/0167989 A1* | 6/2015 | Matsuoka | F24D 19/10 |
| | | | 700/276 |

OTHER PUBLICATIONS

International Preliminary Report on Patentability for corresponding International application No. PCT/US2015/054113, dated Apr. 20, 2017 (8 pages).

STI Instruction Manual Fastrack TM (software & settings), Jan. 2012 (76 pages).

International Search Report and Written Opinion for corresponding International application No. PCT/US2015/054133, dated May 13, 2016.

Office Action in Chinese Patent Application No. 101265990A, dated Jan. 4, 2019.

* cited by examiner

CUT-OFF TRANSITION FOR CONTROL VALVE POSITIONERS

CROSS-REFERENCE TO RELATED APPLICATIONS

This application claims benefit to the filing date of U.S. Provisional Patent Application 62/060,549, entitled "Cut-Off Transition for Control Valve Positioners" and filed Oct. 6, 2014, the entire disclosure of which is hereby incorporated herein.

FIELD OF THE DISCLOSURE

The present invention relates generally to process control systems including valves and, more particularly, to methods for controlling valves.

BACKGROUND

Process control systems, like those used in chemical, petroleum, or other processes, typically include pipes through which the flow of fluid or gas is adjusted by opening or closing valves. The valves are controlled by one or more process controllers communicatively coupled to one or more field devices via analog, digital, or combined analog and digital signal transmission links called buses. The field devices may be, for example, valve positioners, switches, and transmitters (e.g., transmitters of information from sensors of temperature, pressure, fluid level, flow rate, and valve stem position). The field devices are located within a process plant environment and perform process functions such as opening or closing valves, measuring process parameters, gathering diagnostic data, etc.

The process controllers, which may or may not be located within the process plant environment, receive signals representing process measurements made by the field devices, and/or other information pertaining to the field devices. One or more of the process controllers may execute a controller application that runs, for example, different control modules that: (a) make process control decisions, (b) generate control signals based on the received information, and/or (c) coordinate with control modules that are performed by processors located in the field devices. The control modules in the controller send the control signals over the transmission links to the field devices to thereby control the operation of the process.

Information from the field devices and the controller is usually made available over a communication link to one or more other hardware or software devices, such as operator workstations, personal computers, data historians, report generators, centralized databases, etc., which are typically placed in control rooms or other locations away from the harsher plant environment. These hardware devices run applications that may, for example, enable an operator to perform functions with respect to the process, such as changing settings of the process control routine, modifying the operation of the control modules within the controller or the field devices, viewing the current state of the process, viewing alarms generated by field devices and controllers, simulating the operation of the process for the purpose of training personnel, testing the process control software, keeping and updating a configuration database, etc., or testing or gathering data about any of the devices of the process control system, such as any type of valve used in the process control system.

A valve used in the process control system conventionally comprises, as components, a valve seat and a valve closing element that engages the valve seat to close the valve. When these components engage properly, there is a proper valve closure, and the valve has a satisfactory valve seating integrity. Through repeated use in operations of the process control system the valve components may deteriorate due to normal wear, erosion, corrosion, etc.

Traditional smart valve positioners rapidly saturate the servo based on the command signal crossing a cutoff threshold, creating an undesirable valve response, especially on large actuators with volume boosters. For large valves, stem travel can lag significantly behind a servo set-point, especially when tracking ramp signals. When the servo set-point goes into the cutoff threshold, the valve microcontroller and/or positioner will bypass feedback control and drive the current-to-pneumatic (I/P) signal to fully saturate the pneumatics. Cutoffs are based on the servo set-point signal crossing a defined threshold, which is typically set at 0.5% and/or 99.5%. While a fully saturated I/P drive is a desirable state that maintains full seat load in the presence of calibration shifts, for large valves or valves in high pressure service, this can cause the valve plug or actuator piston to hammer into a travel stop, disturbing the process or damaging components.

A mechanism to decelerate the response of the valve as it approaches an end point may typically include a mechanical air cushion and/or an electronic soft stop. Unfortunately, each of these potential implementations includes one or more drawbacks. The mechanical air cushion traps air between the actuator piston and the cylinder end cap. In short, the mechanical air cushion blocks air flow in the exhaust direction, builds up cylinder pressure, and slows down the valve response. To fill the cylinder quickly and distribute air across the piston, additional check valves in the cylinder cap and grooves of the piston face may be required. In addition, the mechanical air cushion is not available for all actuator designs, nor can the mechanical air cushion be field retrofitted. For large valves with heavy moving parts (e.g., plug, stem, and actuator piston), pressure buildup in the cylinder can blow out the air cushion O-ring seals. Also, the mechanical air cushion typically engages near the physical limits of cylinder travel, taking effect around 3% and 97% of rated valve travel. Actuator dynamics change substantially around these areas, which makes throttling control within the 3% threshold problematic. Lastly, because the mechanical air cushion interferes with cylinder pressure registration at the positioner, the accuracy of valve diagnostic tests near the travel endpoints is degraded.

An electronic soft stop is capable of overcoming many of the issues associated with mechanical air cushions. However, the electronic soft stop does not smoothly transition the valve into a hard stop and cannot be used to generate useful diagnostics around the valve seat. Moreover, the electronic soft stop includes several jump discontinuities that can introduce chattering or other undesirable behavior if the process controller is operating near the electronic soft stop threshold, which may lead to an unpredictable response. As such, the electronic soft stop is sensitive to travel calibration errors, which may cause the electronic soft stops to be implemented too early or too late in the dynamic response.

A need therefore exits for providing a controlled saturation of the I/P drive with a smooth, continuous transition of the set-point signal from a cutoff threshold to the saturated state. Controlling a valve with such capability will avoid sensitivities to travel calibration errors, stuck or jammed valves, and will not chatter if the process controller is operating near a hard stop.

SUMMARY

The present invention is directed a method for controlling a valve. The method includes providing, by one or more processors, a first cutoff threshold and a second cutoff threshold; monitoring, by one or more processors, a servo set-point; initiating, by one or more processors, a first cutoff procedure in response to the servo set-point crossing the first cutoff threshold; and initiating, by one or more processors, a second cutoff procedure in response to the servo set-point crossing the second cutoff threshold.

In another embodiment, a system for controlling a valve includes one or more processors coupled to a memory and one or more modules stored on the memory, wherein execution of the one or more modules by the one or more processors cause the system to: provide a first cutoff threshold and a second cutoff threshold; monitor a servo set-point; initiate a first cutoff procedure in response to the servo set-point crossing the first cutoff threshold; and initiate a second cutoff procedure in response to the servo set-point crossing the second cutoff threshold.

In another embodiment, a tangible non-transitory computer-readable medium includes instructions stored thereon for controlling a valve, wherein the instructions, when executed by one or more processors of a computer system, cause the one or more processors to: provide a first cutoff threshold and a second cutoff threshold; monitor a servo set-point; initiate a first cutoff procedure in response to the servo set-point crossing the first cutoff threshold; and initiate a second cutoff procedure in response to the servo set-point crossing the second cutoff threshold.

DETAILED DESCRIPTION

The present invention is directed to reducing and/or eliminating sudden valve motion caused by the activation of a cutoff with a valve positioner. In general, a pair of cutoff thresholds are implemented wherein when the servo set-point crosses a first cutoff threshold, a controller (e.g., processor, microprocessor, microcontroller) ramps the servo set-point from the first cutoff threshold beyond the calibrated set-point range, slowly overdriving the servomechanism, for example, servo, controller, and/or processor. Once the servo set-point reaches a predefined second cutoff threshold, the controller immediately saturates the PP drive signal. More specifically, a transitional ramp signal is used between the time the servo set-point falls within the first cutoff threshold, e.g., soft cutoff threshold, and the time of the second cutoff threshold, e.g., hard cutoff threshold, when full I/P saturation occurs. In other words, when the servo set-point falls within a first cutoff threshold, the processor will slowly ramp the servo set-point beyond the throttling range until a hard cutoff threshold is reached. This will slowly overdrive the servo controller under closed loop control. When the valve eventually comes to a hard stop, the servo controller will go open loop at which point the pneumatics will saturate.

In addition to improving the hard stop transients, a smooth, continuous set-point signal can be used for in-service seat diagnostics. Today, off-line dynamic scan tests are run from −5% to 105% with cutoffs and characterization disabled. The reason for this is that cutoff transients are too fast, which produces minimum travel data at the stop and introduces distortions in actuator pressure readings from velocity effects across the pressure sensors. By transitioning into the valve seat without jump discontinuities in the set-point, more accurate and useful seat profile data can be collected when the device is in service.

Figure 1:
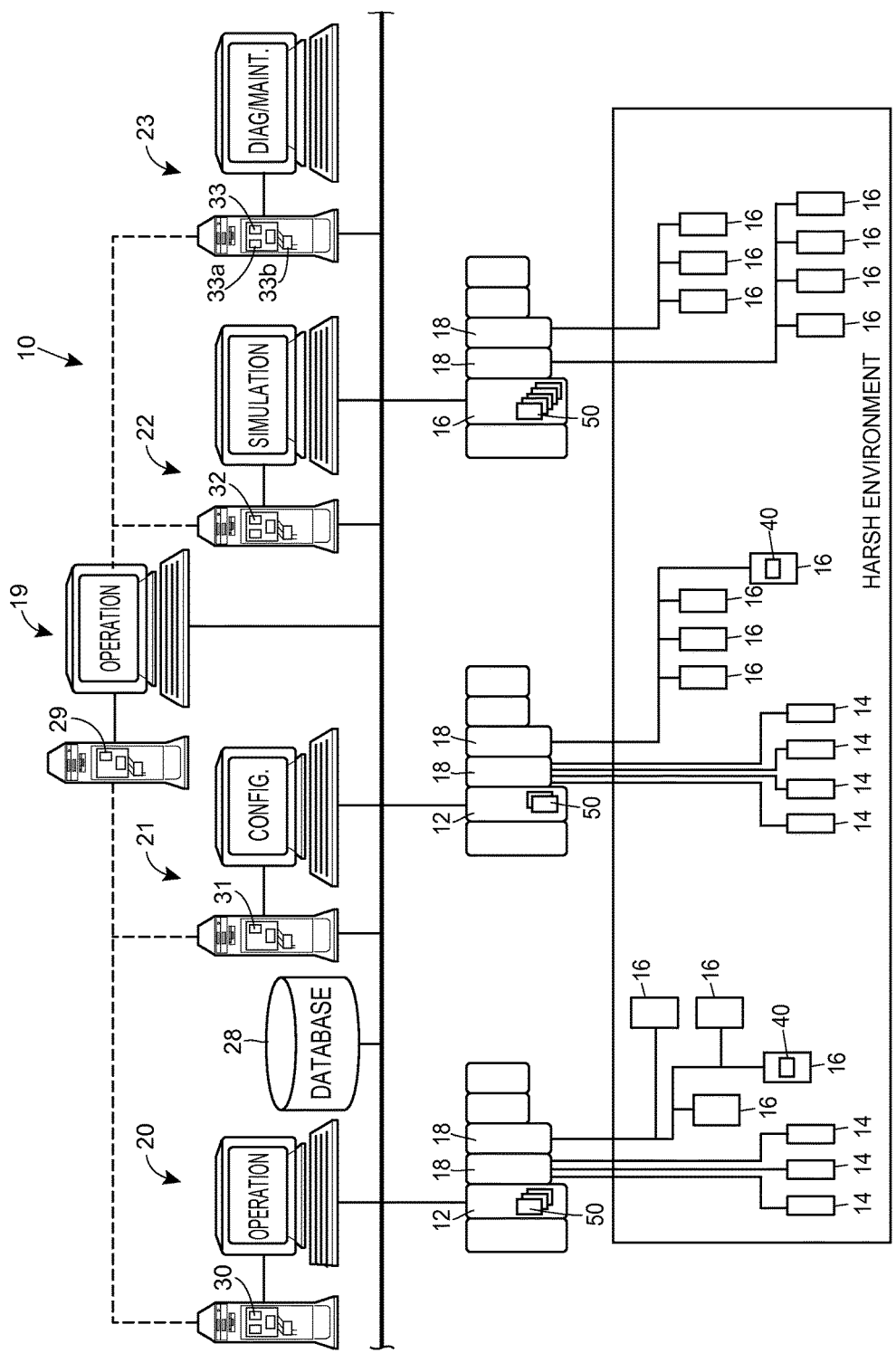
FIG. 1 is a block diagram of a process control system, located within a process plant that may control the valve during normal process operations.

FIG. 1 illustrates an example of a process plant 10 including various functional areas, each of which may be provided with an embodiment of a valve control method in accordance with the present invention. The process plant 10 includes a distributed process control system having one or more controllers 12, each connected to one or more field devices 14 or 16 via input/output (I/O) devices or cards 18. The controllers 12 are also coupled to one or more host or operator workstations 19-23 via a data highway 25. A database 28 is coupled to the data highway 25 and operates as a data historian to collect and store parameter, status, and other data associated with the controllers and field devices within the plant 10 and/or as a data historian database that stores the current or previous test data of plant 10 as downloaded from or stored within the controllers 12 and/or field devices 14 and 16. The database 28 may additionally store graphical objects to provide various graphical representations of the process plant 10. An embodiment of the valve control system described herein may be stored as a routine as any one or more of software applications 29-33 on the respective one or more host or operator workstations 19-23. Alternatively, or additionally, an embodiment of the automatic seating integrity test method described herein may be stored at the controller 12 (e.g., software application 50) and/or at a storage 114 of the positioner 109 of FIG. 2.

The field devices 14 and 16 may be located within a harsh process plant environment, while the controllers 12, I/O cards 18, operator workstations 19-23, and the database 28 may be located in control rooms or other less harsh environments that are more easily accessible by maintenance and various other process plant personnel. In some cases, process plant personnel may use mobile, wireless, handheld devices to access information that is generated by embodiments of the valve control system and/or method described herein.

Figure 2:
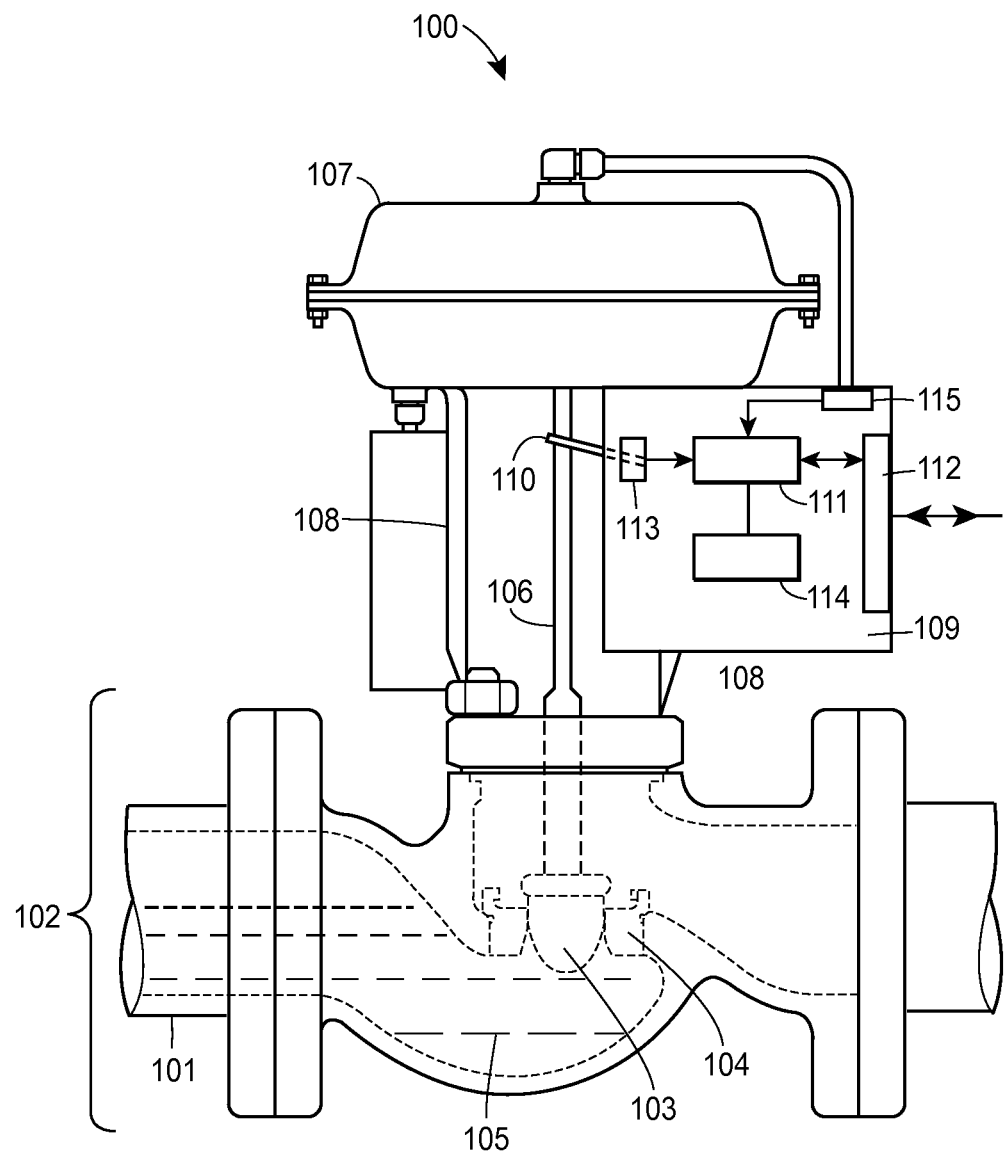
FIG. 2 is an elevational view of a control valve and associated equipment for use with the process control system of FIG. 1, and on which is performed a soft cutoff in accordance with an example of the present invention.

A valve seating integrity test method described herein may be integrated into different types of control systems. The control system may be a standalone control system or a distributed control system. A distributed control system includes controller elements that are not central in location but are distributed throughout the system with each sub-system controlled by one or more of the distributed controllers. An example of a distributed control system is illustrated in FIG. 1, which includes the valve illustrated in FIG. 2 as a part of a sub-system of the overall process control system operation, wherein system controller 12 controls the valve 102 that is illustrated in FIG. 2. For example, either the analog field device 14 or the digital field device 16 may represent the positioner 109 of the valve control system illustrated in FIG. 2. Alternatively, the valve control method described herein may be integrated into the valve control system that may be executed entirely by the valve itself, such as the valve control system illustrated in FIG. 2.

FIG. 2 illustrates an embodiment of a valve control system 100 attached to a pipe 101 of a process plant, such as the process plant 10 of FIG. 1. The flow of material 105 through the pipe 101 is controlled by a control valve 102 comprising a valve closing element 103 coupled to a valve rod 106 or stem, and a valve seat 104. The material 105 may be a liquid or a gas. The valve rod 106 moves the closing element 103 up or down to open or close the control valve 102. The valve 102 is closed and/or opened with a force that is produced by a valve actuator 107, such as a pneumatic drive. The actuator 107 is coupled to the housing of the valve 102 via a yoke 108. A positioner 109, such as an intelligent positioner, is mounted to the yoke 108 and is used to detect the movement of the valve rod 106 via a valve movement indicator 110, such as a feedback rod. The valve movement indicator 110 is coupled to a valve position sensor 113, which is coupled to a valve control unit 111, which may be a processor, such as a central processing unit (CPU), or more than one processor. The control unit 111 receives a set-point value or control signal from an interface 112 that is coupled to a controlling device, such as the workstations 19, 20, 21, 22, 23 or controllers 12 of FIG. 1. For example, the control unit 111 may receive the set-point or control signal from any controller 12 of FIG. 1. The set-point is the target value that an automatic control system will send to a device it controls.

Alternatively, the valve movement indicator 110 may be a linkageless position feedback device, which employs methods of coupling and/or monitoring the valve rod 106 movement without having a direct connection with the valve rod 106. For example, the valve movement indicator 110 may be an electro-magnetically linked movement indicator.

As noted above, the control unit 111 may receive the set-point value from the controller 12 and may then control the control valve 102 according to the received set-point value. The set-point value indicates how much the valve should be opened or closed. The control unit 111 causes the valve to move in accordance with the received set-point value. The control unit 111 checks for feedback information from the position sensor 113 and stores the position data from the sensor 113 in a storage device 114. The positioner 109 may also include a pressure sensor 115 which, depending on the type of actuator 107, may be one or more pressure sensors. Data obtained by the pressure sensor 115 may also be used by the control unit 111 as a basis for moving the valve 102 in accordance with the set-point value. The pressure data from the sensor 115 may also be stored in the storage device 114. Also, as indicated above, a portion or whole of the software application of the valve integrity testing method described herein may be stored at the storage device 114.

Referring still to FIGS. 1 and 2, during normal operation of the process control system that includes the valve 102, the valve is operated at a set-point which, as noted above, is an input to the control unit 111 of the positioner 109 in FIG. 2. As is also noted above, the set-point defines the extent to which the valve is to open and is expressed as a percentage of a fully open valve. Thus, a set-point value of 100% defines a fully open valve, wherein the valve closing element 103 is spaced a maximum distance from valve seat 104; a set-point value of 0% corresponds to a fully closed valve, wherein the closing element 103 is seated on the valve seat 104; and a set-point value between substantially 0% and 100% corresponds to a partially open valve.

Figure 3:
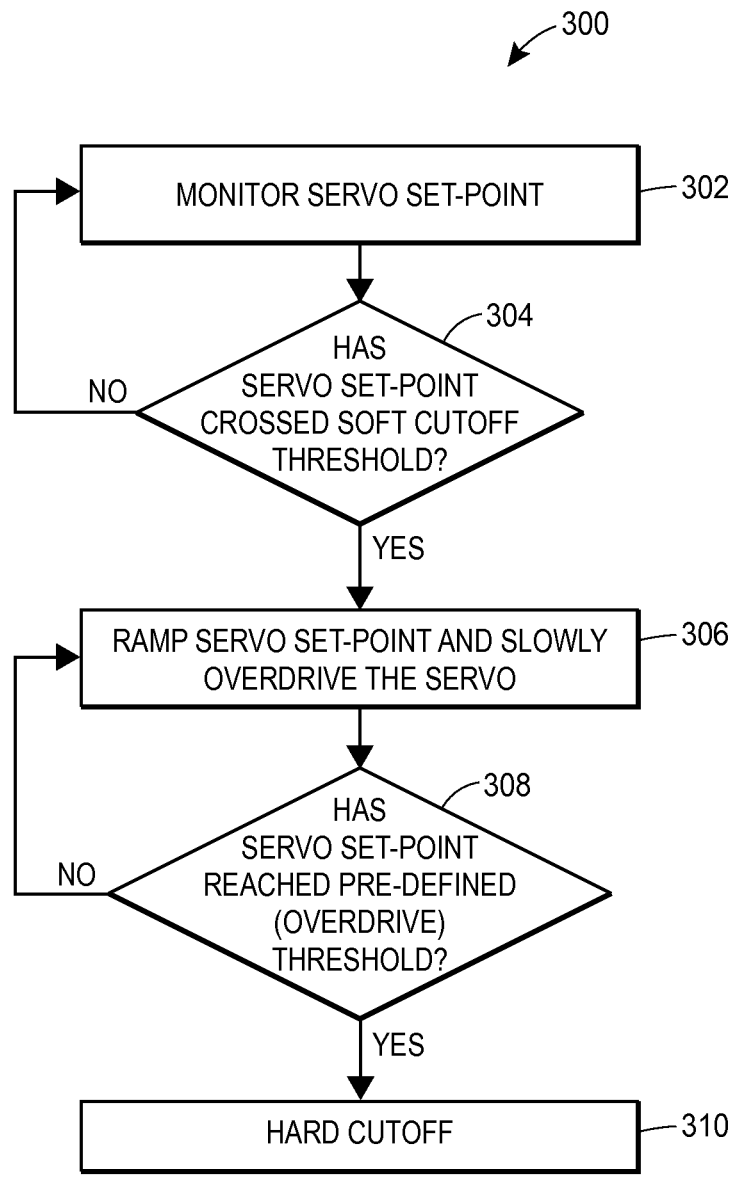
FIG. 3 is a flow diagram illustrating an example of a valve controlling method in accordance with the present invention.

FIG. 3 depicts one example method 300 capable of being executed on the control valve system 100 illustrated in FIG. 2, wherein the method reduces and/or eliminates sudden valve motion caused by the activation of a hard cutoff. In general, a saturation delay is implemented prior to transitioning to pressure control, e.g., end-point pressure control (EPPC), from throttling control (e.g., travel control) of the valve. The saturation delay provides sufficient time for the valve to reach a hard stop and saturate before executing end-point pressure control; thus preventing the execution of a hard cutoff during mid-travel of the valve. In one configuration, the method 300 utilizes a pair of cutoff thresholds, e.g., a first cutoff threshold or soft cutoff threshold and a second cutoff threshold or hard cutoff threshold, for controlling the valve positioner. The servo set-point is monitored with respect to the soft cutoff threshold (block 302). When the servo set-point crosses the soft cutoff threshold (block 304), the soft cutoff is initiated and the controller/processor slowly overdrives the servo (block 306). The gradual overdriving of the servo continues until the servo set-point reaches a predetermined overdrive threshold (block 308), e.g., second cutoff threshold or hard cutoff threshold, wherein the servo transitions into a hard cutoff (block 310).

Figure 4:
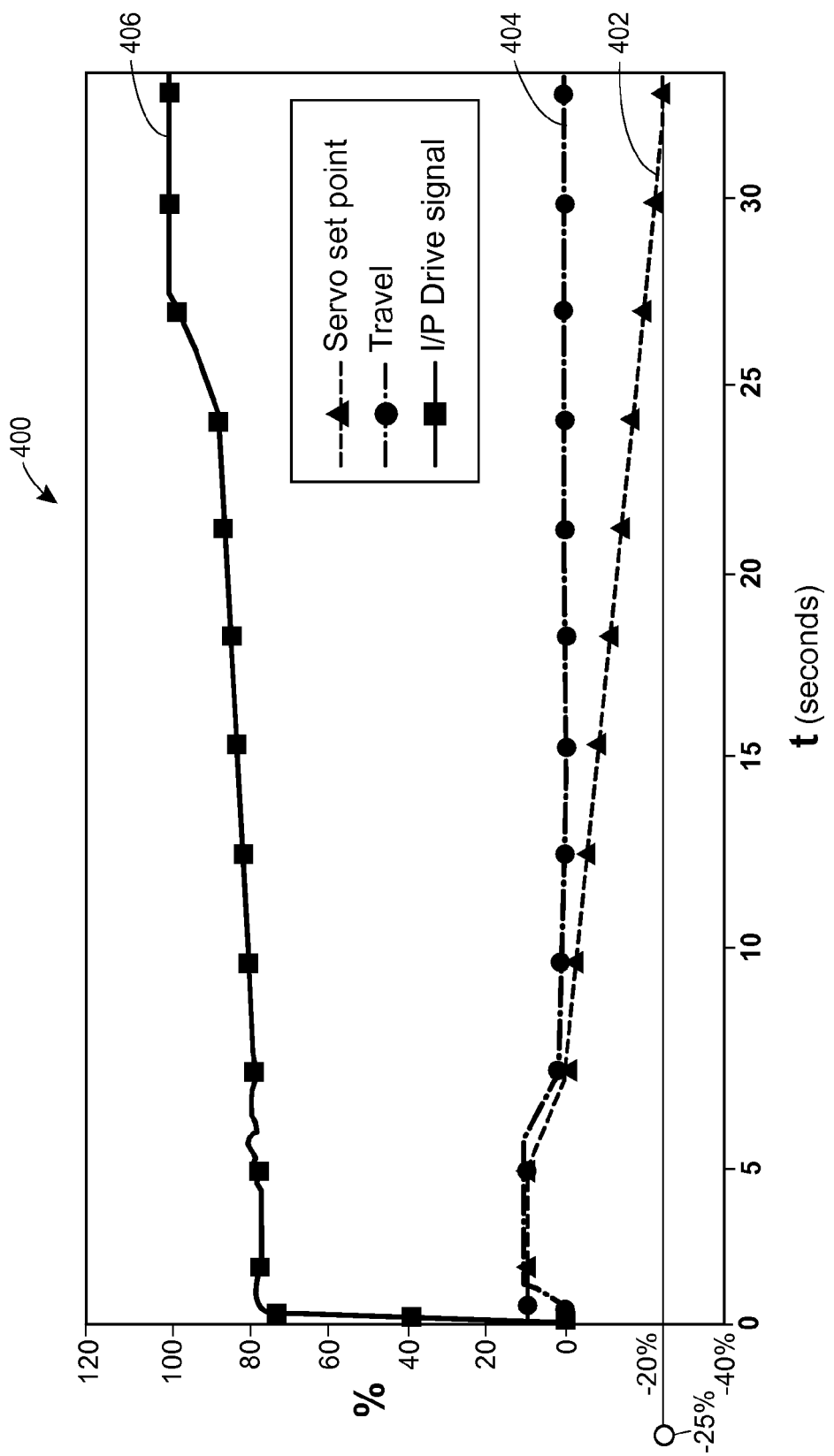
FIG. 4 illustrates a graphical representation of an example response of a control valve to a soft cutoff.

FIG. 4 is a graphic illustration 400 of an example response of a control valve to a soft cutoff. A servo set-point 402 is depicted by a line including solid triangles, valve travel 404 is depicted by a line including solid circles, and an I/P drive signal 406 is depicted by a line including solid squares. The soft cutoff threshold may be set at 0.5% and 99.5%. In this example, the travel target, which is upstream of the servo set-point, starts at 10% and is ramped to 0% at −4%/sec. Outside of the 0.5% cutoff threshold, the servo set-point tracks the travel target. Once the travel target falls below the 0.5% soft cutoff threshold, the servo set-point transitions to a ramp signal from 0.5% to −25% at a rate of −1%/sec. Once the servo set-point reaches −25%, the I/P drive is transitioned to the second cutoff, i.e., hard cutoff. In this example, it can be seen that the I/P drive was fully saturated at 100% before the −25% set-point threshold for the hard cutoff was reached. As such, the transition to full saturation at the hard cutoff may be considered to be bumpless.

An alternative to the servo set-point transitioning to a ramp signal when the soft cutoff is initiated proximate the soft cutoff threshold, a time delay may be implemented whereupon expiration of the time delay, a hard cutoff is initiated. For example, once the set-point crosses the soft cutoff threshold, a time delay of 10 seconds can be initiated, whereupon at the completion of the 10 second delay, the hard cutoff is initiated. In a further embodiment, a combination of the ramp signal and the time delay can be implemented with the two cutoff thresholds. For example, upon the set-point crossing the soft cutoff threshold, the servo set-point transitions to a ramp signal from 0.5% to −5% at a rate of −1%/sec and then implements a time delay when the ramp signal reached −5%., after which full saturation via a hard cutoff can be initiated.

As discussed above, advantages of the present control valve system over conventional control valve systems include: an adjustable ramp rate to gradually transition the valve travel into to a mechanical stop once the command signal crosses a cutoff threshold; smooth, continuous operation of the servo while in the cutoff mode of operation; bumpless transfer from throttling control to a fully saturated state at the mechanical stop, i.e., elimination of the jump discontinuities, which improves seat diagnostics; and, variable ramp rates and adjustable cutoff thresholds at either stop to allow the user to fine tune the valve response into a hard stop, eliminating undesirable transients.

Additional advantages of the present cutoff transition for a control valve positioner over a conventional cutoff transition for a control valve positioner may include that the present cutoff transition does not require stopping the operation of the valve, or stopping a process that is using the valve, or isolating the valve to avoid an interruption of the process, or requiring the analysis of a human operator. A user is not required to manually perform the present cutoff transition embodiments described herein, and a user is not required to manually interpret the results of the present cutoff transition embodiments described herein. Therefore, embodiments of the present cutoff transition described herein may be better able to determine whether and when the valve seating integrity is compromised. Also, embodiments of the present cutoff transition described herein may be better able to maintain the productivity and safety levels of the operations of which the valve is a part.

For example, the valve may be a part of a single control loop operation that is controlled locally by the valve positioner 109 (FIG. 2) itself or the valve may be a part of an operation that involves a more complex process control system, which is controlled by the controller 12 (FIG. 1). Either way, the present cutoff transition methods described herein enable the cutoff transition to be run during normal process control operations, which involve a valve that is to be tested. Normal process plant operations include operations wherein the controller sends a control signal to the valve in response to a closed loop process control operation of a control routine configured to be executed by the controller. Normal process plant operations also include operations wherein the controller is configured to process the position data as feedback information for use by a closed loop control routine configured to be executed by the controller.

The following discussion is primarily with reference to the subject matter illustrated in FIG. 1.

Each controller 12, which may be any type of process controller or a more specific type of process controller, such as the DeltaV™ controller sold by Emerson Process Management, stores and executes a controller application that implements a control strategy using any number of different, independently executed, control modules or blocks 50. Each control module 50 may be made up of what are commonly referred to as function blocks wherein each function block is a part or a subroutine of an overall control routine and operates in conjunction with other function blocks (via communications called links) to implement process control loops within process plant 10. Function blocks may be objects in an object oriented programming protocol. Function blocks may perform an input function, such as that associated with a transmitter, a sensor or other process parameter measurement device, or a control function, such as that associated with a control routine that performs PID, fuzzy logic, etc. control. Function blocks may perform an output function that controls the operation of some device, such as a valve, to perform some physical function within process plant 10. Hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc. and are not limited to being designed and implemented using the function block or any other particular programming technique. Each of the controllers 12 may also support the AMS® Suite of applications and may use predictive intelligence to improve availability and performance of production assets including mechanical equipment, electrical systems, process equipment, instruments, field and smart field devices 14, 16, and valves.

In the plant 10 illustrated in FIG. 1, the field devices 14 and 16 connected to controllers 12 may be standard 4-20 ma devices, or may be smart field devices, such as HART, Profibus, or FOUNDATION™ Fieldbus field devices, which include a processor and a memory, or may be any other desired type of devices. Some of these devices, such as Fieldbus field devices (each labeled with reference number 16 in FIG. 1), may store and execute modules, or submodules, such as function blocks, associated with the control strategy implemented in the controllers 12. The function blocks 40, which are illustrated in FIG. 1 as being disposed in two different ones of Fieldbus field devices 16, may be executed in conjunction with the execution of the control modules 50 within controllers 12 to implement process control, as is well known. Of course, field devices 14 and 16 may be any types of devices, such as sensors, valves, transmitters, positioners, etc., and I/O devices 18 may be any types of I/O devices conforming to any desired communication or controller protocol such as HART, Fieldbus, Profibus, etc.

In process plant 10 of FIG. 1, workstations 19-23 may include various applications that are used for various different functions performed by the same or different personnel within plant 10. Each workstation 19-23 includes a memory, that stores various applications, programs, data structures, etc., and a processor which may be used to execute any of the applications stored in the memory, such as a routine including all or any portion of the seat integrity test systems and/or methods described herein.

Workstations 19-23 include hardware and/or software that provide operation, configuration, simulation, and diagnostic and/or maintenance operations to the plant from a high process control system level to the lower operational level of a single field device. While the various associated applications 29-33 are illustrated in FIG. 1 as being located in different workstations dedicated to one of those functions, it will be understood that various applications 29-33 associated with these or other plant functions may be located in and executed in the same or different workstations or computers within the plant 10, depending on the needs and set-up of the plant 10. Thus, for example, one or more control applications (e.g., 29) and maintenance/diagnostic applications (e.g., 33) may be executed in the same workstation 19-23, while different individual maintenance/diagnostic applications (e.g., 33) or different individual control applications (e.g., 29) may be executed in different ones of the workstations 19-23 and/or the controllers 12.

In the example illustrated in FIG. 1, workstation 23 is illustrated as a diagnostic/maintenance workstation and includes a number of diagnostic and/or maintenance applications 33 that may be used by various personnel to test or view the needs of the overall plant 10, and/or to test or view the operating or working condition of the various devices 12, 14, 16, etc. Applications 33 may include support applications 33A such as other maintenance/diagnostic applications, calibration applications, vibration analysis applications, report generation applications or any other support applications, such as test analysis applications that may be used to assist a process personnel in performing maintenance/diagnostic functions within the plant 10. For example, a maintenance/diagnostic application 33A may include the valve seat integrity testing application 33B as described herein. Alternatively or additionally, the valve seat integrity testing application 33B may be implemented wholly and/or partly at any controller 12 or any field device 14, 16, or a combination of the three. The valve seat integrity testing application 33B may incorporate any combination of function blocks 40, control modules 50, control applications 29, and maintenance/diagnostic applications 30-33. The valve seat integrity testing application 33B may also be a software algorithm that is entirely embedded in a local processor of any valve field device 14, 16.

As discussed above, any of the system wide applications, such as applications 29, 30, 31, 32, 33, 33A, 33B and/or any of the local applications that may be stored in the control unit 111 or storage device 114 of positioner 109 (or a separately functioning local test control unit 111) may implement any of the methods described herein. The methods described herein may be implemented via the valve seating integrity testing system 100 of FIG. 2 or via an alternative embodiment, such as an embodiment where the valve positioner may be separated from the control unit of the valve seating integrity testing system.

It is to be understood that embodiments of the valve control system, method, and computer-readable medium described herein may be performed on any one or more of the valves in the process control system while the process control system maintains operations. As discussed herein, embodiments of the invention may detect valve issues that include worn out seat components, seat positioning concerns, and seat erosion problems. For information on these and other valve problems that may be avoided using embodiments of the invention described herein, see (1) U.S. Pat. No. U.S. Pat. No. 6,298,454, titled "Diagnostics in a Process Control System," assigned to Fisher-Rosemount Systems, Inc.; (2) U.S. Pat. No. 7,478,012, titled, "Computerized Evaluation of Valve Signature Graphs," assigned to Fisher Controls International LLC; and, (3) U.S. Pat. No. 8,421,643, titled "Automatic Valve Seating Integrity," assigned to Fisher Controls International LLC; all of which are herein incorporated by reference in their entirety.

Of course, the applications and benefits of the systems, methods, and techniques described herein are not limited to only the above examples. Many other applications and benefits are possible by using the systems, methods, and techniques described herein.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

Aspect 1: A method for controlling a valve, the method comprising providing, by one or more processors, a first cutoff threshold and a second cutoff threshold; monitoring, by one or more processors, a servo set-point; initiating, by one or more processors, a first cutoff procedure in response to the servo set-point crossing the first cutoff threshold; and initiating, by one or more processors, a second cutoff procedure in response to the servo set-point crossing the second cutoff threshold.

Aspect 2: The method of claim 1, wherein initiating a first cutoff procedure includes: slowly overdriving the servo by ramping the servo set-point from the first cutoff threshold to beyond a calibrated set-point range.

Aspect 3: The method of any one of claim 1 or 2, wherein ramping the servo set-point includes a exponentially decaying signal.

Aspect 4: The method of any one of claims 1-3, wherein ramping the servo set-point includes a monotonically decreasing signal or a monotonically increasing signal.

Aspect 5: The method of any one of claims 1-4, wherein initiating a first cutoff procedure includes setting a cutoff ramp rate to match a velocity of an upper or lower limit of the set-point.

Aspect 6 The method of any one of claims 1-5, wherein initiating a second cutoff procedure includes switching to pressure control from travel control.

Aspect 7: The method of any one of claims 1-6, wherein initiating a first cutoff procedure includes utilizing closed loop control to slowly overdrive the servo by ramping the servo-set-point from the first cutoff to beyond a calibrated set-point range.

Aspect 8: The method of any one of claims 1-7, wherein initiating a second cutoff procedure includes utilizing open loop control to fully saturate an I/P drive signal.

Aspect 9: A system for controlling a valve including one or more processors coupled to a memory and one or more modules stored on the memory, wherein execution of the one or more modules by the one or more processors cause the system to: provide a first cutoff threshold and a second cutoff threshold; monitor a servo set-point; initiate a first cutoff procedure in response to the servo set-point crossing the first cutoff threshold; and initiate a second cutoff procedure in response to the servo set-point crossing the second cutoff threshold.

Aspect 10: The system of claim 9, wherein to initiate a first cutoff procedure includes:
slowly overdriving the servo by ramping the servo set-point from the first cutoff threshold to beyond a calibrated set-point range.

Aspect 11: The system of claim 10, wherein ramping the servo set-point includes an exponentially decaying signal.

Aspect 12: The system of claim 10, wherein ramping the servo set-point includes a monotonically decreasing signal or a monotonically increasing signal.

Aspect 13: The system of claim 9, wherein to initiate a first cutoff procedure includes setting a cutoff ramp rate to match a velocity of an upper or lower limit of the set-point.

Aspect 14: The system of claim 9, wherein to initiate a second cutoff procedure includes switching to pressure control from travel control.

Aspect 15: The system of claim 9, wherein to initiate a first cutoff procedure includes utilizing closed loop control to slowly overdrive the servo by ramping the servo-set-point from the first cutoff to beyond a calibrated set-point range.

Aspect 16: The system of claim 15, wherein to initiate a second cutoff procedure includes utilizing open loop control to fully saturate an I/P drive signal.

Aspect 17: A tangible non-transitory computer-readable medium having instructions stored thereon for controlling a valve, the instructions, when executed by one or more processors of a computer system, cause the one or more processors to: provide a first cutoff threshold and a second cutoff threshold; monitor a servo set-point; initiate a first cutoff procedure in response to the servo set-point crossing the first cutoff threshold; and initiate a second cutoff procedure in response to the servo set-point crossing the second cutoff threshold.

Aspect 18: The tangible non-transitory computer-readable medium of claim 17, wherein to initiate a first cutoff procedure includes: slowly overdriving the servo by ramping the servo set-point from the first cutoff threshold to beyond a calibrated set-point range.

Aspect 19: The tangible non-transitory computer-readable medium of claim 18, wherein ramping the servo set-point includes an exponentially decaying signal.

Aspect 20: The tangible non-transitory computer-readable medium of claim 18, wherein ramping the servo set-point includes a monotonically decreasing signal or a monotonically increasing signal.

Aspect 21: The tangible non-transitory computer-readable medium of claim 17, wherein to initiate a first cutoff procedure includes setting a cutoff ramp rate to match a velocity of an upper or lower limit of the set-point.

Aspect 22: The tangible non-transitory computer-readable medium of claim 17, wherein to initiate a second cutoff procedure includes switching to pressure control from travel control.

Aspect 23: The tangible non-transitory computer-readable medium of claim 17, wherein to initiate a first cutoff procedure includes utilizing closed loop control to slowly overdrive the servo by ramping the servo set-point from the first cutoff to beyond a calibrated set-point range.

Aspect 24: The tangible non-transitory computer-readable medium of claim 23, wherein to initiate a second cutoff procedure includes utilizing open loop control to fully saturate an PP drive signal.

What is claimed is:

1. A method for closing or opening a valve, the method comprising:
   providing, by one or more processors, a calibrated servo set-point range of a servo for moving the valve, the range including a first cutoff threshold;
   monitoring, via a sensor coupled to one or more processors, a servo set-point associated with the servo moving the valve;
   detecting, by one or more processors, the servo set-point crossing the first cutoff threshold;
   initiating, by one or more processors, a first procedure in response to the servo set-point crossing the first cutoff threshold, the first procedure including adjusting a current-to-pneumatic (IP) drive signal to overdrive the servo set-point to a second cutoff threshold beyond the calibrated servo set-point range;
   detecting, by one or more processors, the servo set-point crossing the second cutoff threshold; and
   initiating, by one or more processors, a second procedure in response to the servo set-point crossing the second cutoff threshold, the second procedure including saturating the I/P drive signal to maintain closure of the valve.

2. The method of claim 1, wherein initiating the first procedure includes:
   ramping the servo set-point from the first cutoff threshold to beyond the calibrated set-point range.

3. The method of claim 2, wherein ramping the servo set-point includes an exponentially decaying signal.

4. The method of claim 2, wherein ramping the servo set-point includes a monotonically decreasing signal or a monotonically increasing signal.

5. The method of claim 1, wherein initiating the first procedure includes setting a cutoff ramp rate to match a velocity of an upper or lower limit of the set-point.

6. The method of claim 1, wherein initiating the second procedure includes switching control of the valve from travel control to pressure control.

7. The method of claim 1, wherein initiating the first procedure includes utilizing closed loop control to ramp the servo-set-point from the first cutoff threshold to beyond the calibrated set-point range.

8. The method of claim 7, wherein initiating the second procedure includes utilizing open loop control to fully saturate the I/P drive signal.

9. A system for closing or opening a valve including one or more processors coupled to a memory and one or more modules stored on the memory, wherein execution of the one or more modules by the one or more processors cause the system to:
   provide a calibrated servo set-point range of a servo for moving the valve, the range including a first cutoff threshold;
   monitor, via a sensor coupled to the one or more processors, a servo set-point associated with the servo moving the valve;
   detect the servo set-point crossing the first cutoff threshold;
   initiate a first procedure in response to the servo set-point crossing the first cutoff threshold, the first procedure including adjusting a current-to-pneumatic (IP) drive signal to overdrive the servo set-point to a second cutoff threshold beyond the calibrated servo set-point range;
   detect the servo set-point crossing the second cutoff threshold; and
   initiate a second procedure in response to the servo set-point crossing the second cutoff threshold, the second procedure including saturating the I/P drive signal to maintain closure of the valve.

10. The system of claim 9, wherein to initiate the first procedure includes:
    ramping the servo set-point from the first cutoff threshold to beyond the calibrated set-point range.

11. The system of claim 10, wherein ramping the servo set-point includes an exponentially decaying signal.

12. The system of claim 10, wherein ramping the servo set-point includes a monotonically decreasing signal or a monotonically increasing signal.

13. The system of claim 9, wherein to initiate the first procedure includes setting a cutoff ramp rate to match a velocity of an upper or lower limit of the set-point.

14. The system of claim 9, wherein to initiate the second procedure includes switching control of the valve from travel control to pressure control.

15. The system of claim 9, wherein to initiate the first procedure includes utilizing closed loop control to ramp the servo-set-point from the first cutoff to beyond the calibrated set-point range.

16. The system of claim 15, wherein to initiate the second procedure includes utilizing open loop control to fully saturate the I/P drive signal.

17. A tangible non-transitory computer-readable medium having instructions stored thereon for closing or opening a valve, the instructions, when executed by one or more processors of a computer system, cause the one or more processors to:
   provide a calibrated servo set-point range of a servo for moving the valve, the range including a first cutoff threshold;
   monitor, via a sensor coupled to the one or more processors, a servo set-point associated with the servo moving the valve;
   detect the servo set-point crossing the first cutoff threshold;
   initiate a first procedure in response to the servo set-point crossing the first cutoff threshold, the first procedure including adjusting a current-to-pneumatic (IP) drive signal to overdrive the servo set-point to a second cutoff threshold beyond the calibrated servo set-point range;
   detect the servo set-point crossing the second cutoff threshold; and
   initiate a second procedure in response to the servo set-point crossing the second cutoff threshold, the second procedure including saturating the I/P drive signal to maintain closure of the valve.

18. The tangible non-transitory computer-readable medium of claim 17, wherein to initiate a first procedure includes ramping the servo set-point from the first cutoff threshold to beyond the calibrated set-point range.

19. The tangible non-transitory computer-readable medium of claim 18, wherein ramping the servo set-point includes an exponentially decaying signal.

20. The tangible non-transitory computer-readable medium of claim 18, wherein ramping the servo set-point includes a monotonically decreasing signal or a monotonically increasing signal.

21. The tangible non-transitory computer-readable medium of claim 17, wherein to initiate the first procedure includes setting a cutoff ramp rate to match a velocity of an upper or lower limit of the set-point.

22. The tangible non-transitory computer-readable medium of claim 17, wherein to initiate the second procedure includes switching control of the valve from travel control to pressure control.

23. The tangible non-transitory computer-readable medium of claim 17, wherein to initiate the first procedure includes utilizing closed loop control to ramp the servo set-point from the first cutoff to beyond the calibrated set-point range.

24. The tangible non-transitory computer-readable medium of claim 23, wherein to initiate the second procedure includes utilizing open loop control to fully saturate the I/P drive signal.

* * * * *